(12) United States Patent
Muci et al.

(10) Patent No.: US 9,316,323 B2
(45) Date of Patent: Apr. 19, 2016

(54) HYDRAULIC MECHANISM FOR VALVES

(75) Inventors: Moses A. Muci, Marshalltown, IA (US); John C. Bessman, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 811 days.

(21) Appl. No.: 13/523,696

(22) Filed: Jun. 14, 2012

(65) Prior Publication Data

US 2013/0334449 A1 Dec. 19, 2013

(51) Int. Cl.
*F16K 7/17* (2006.01)
*F16K 31/122* (2006.01)

(52) U.S. Cl.
CPC ............... *F16K 7/17* (2013.01); *F16K 31/1225* (2013.01)

(58) Field of Classification Search
CPC .............. F16K 1/00; F16K 1/04; F16K 31/12
USPC ................... 251/57, 61, 61.1, 61.2, 63.5, 324
See application file for complete search history.

(56) References Cited

U.S. PATENT DOCUMENTS

| | | | |
|---|---|---|---|
| 5,758,862 A | 6/1998 | Sturman | |
| 6,062,532 A * | 5/2000 | Gurich et al. | 251/57 |
| 6,142,443 A * | 11/2000 | Potschin et al. | 251/57 |
| 6,168,133 B1 * | 1/2001 | Heinz et al. | 251/57 |
| 6,913,240 B1 * | 7/2005 | MacKenzie | 251/57 |
| 7,255,321 B2 * | 8/2007 | Tomioka et al. | 251/5 |
| 8,210,493 B2 * | 7/2012 | Miyagawa et al. | 251/63.5 |
| 8,794,588 B1 * | 8/2014 | Jorgensen | 251/57 |
| 8,840,082 B2 * | 9/2014 | Takeda et al. | 251/63.5 |
| 2005/0098748 A1 | 5/2005 | Suzuki | |

FOREIGN PATENT DOCUMENTS

EP 0 477 400 A1 4/1992

OTHER PUBLICATIONS

International Search Report and Written Opinion for Application No. PCT/US2013/044910, dated Sep. 16, 2013.

\* cited by examiner

*Primary Examiner* — Craig Schneider
*Assistant Examiner* — Daniel P Donegan
(74) *Attorney, Agent, or Firm* — Marshall, Gerstein & Borun LLP

(57) ABSTRACT

A valve assembly includes a first piston member displaceably disposed within a first chamber. A second piston member is coupled to a valve closure element, such as a diaphragm, and the second piston member is disposed within a second chamber. A longitudinal displacement of the first piston member relative to the first chamber causes hydraulic fluid disposed within the first chamber to longitudinally displace the second piston member such that the valve closure element engages a valve seat to close the valve assembly. The area of the second piston member is greater than that of the first piston member to multiply the force provided by an actuator that displaces a valve stem coupled to the first piston member.

20 Claims, 5 Drawing Sheets

HYDRAULIC MECHANISM FOR VALVES

FIELD OF THE DISCLOSURE

This disclosure relates generally to valves, and more particularly, to hydraulic mechanisms to actuate sanitary control valves.

BACKGROUND

Sanitary control valves are generally used in biotechnology and pharmaceutical applications that require clean or sterile processing. Typical sanitary control valves include an actuator portion and a control portion. The actuator portion includes an actuator diaphragm that is coupled to a longitudinally-disposed actuator stem, and compressed fluid introduced into an actuation chamber acts on the diaphragm to displace the actuation stem along its axis.

When the actuator stem is downwardly displaced, the distal end of the actuator stem engages a linkage body having a pair of engagement arms pivotably secured thereto, thereby causing the engagement arms to outwardly displace as the actuator stem causes the engagement arms to pivot. A roller disposed at the distal end of each engagement arm provides a downward force against a compression plate such that the compression plate downwardly displaces. Because the engagement arms are pivotably coupled to the linkage body, the arms act as a lever multiplying the downward force applied to the top surface of the compression plate. The compression plate has a bottom surface that engages a control diaphragm, and the downward displacement of the compression plate causes a portion of the control diaphragm to engage a valve seat to prevent flow from a valve inlet to a valve outlet. When the actuator stem is subsequently upwardly displaced, a spring biases the compression plate upwards such that the control diaphragm is longitudinally spaced from the valve seat, thereby allowing flow from the valve inlet to the valve outlet.

In such a configuration, debris or shavings that have accumulated on the top portion of the compression plate can damage the compression plate and/or the rollers over time as the rollers engage the compression plate. Such damage could severely reduce the force multiplication provided to the compression plate and result in a corresponding reduction in diaphragm sealing performance. In addition, the linkage body assembly has a large number of moving parts, and maintenance and replacement of damaged and worn parts increases costs and the amount of time the valve is taken out of service.

BRIEF SUMMARY OF THE DISCLOSURE

A valve assembly includes a valve stem having a first end and a second end that extends along a longitudinal axis, and the valve stem is adapted to displace along the longitudinal axis. The valve assembly further includes a first piston member coupled to the first end of the valve stem, and the first piston member has an outer perimeter that defines a first area. The valve assembly additionally includes a compression member that is adapted to engage a diaphragm and a second piston member coupled to the compression member, the second piston member having an outer perimeter that defines a second area, wherein the first piston member and the second piston member may be longitudinally separated. The valve assembly additionally includes a first chamber having a first bore that is defined by one or more inner surfaces, the first bore being adapted to receive the first piston member such that the first piston member is longitudinally displaceable within the first bore relative to the first chamber. The first piston member sealingly engages the one or more inner surfaces defining the first bore such that a bottom portion of the first piston member and the one or more inner surfaces defining the first bore at least partially define a first interior volume. The valve assembly additionally includes a second chamber having a second bore extending along the longitudinal axis and being defined by one or more inner surfaces, the second bore being adapted to receive the second piston member such that the second piston member is longitudinally displaceable within the second bore relative to the second chamber, wherein the second piston member sealingly engages the one or more inner surfaces defining the second bore such that a top portion of the second piston member and the one or more inner surfaces defining the second bore at least partially define a second interior volume. A conduit portion extends from the first chamber to the second chamber such that the first interior volume is in fluid communication with the second interior volume. A hydraulic fluid is disposed in the first interior volume, the conduit portion, and the second interior volume such that a downward displacement of the first piston member relative to the first chamber causes the hydraulic fluid to provide pressure on the top portion of the second piston member and cause the second piston member to downwardly displace.

A valve assembly may also include a first piston member coupled to a first end of a valve stem, and the first piston member may be displaceably disposed within a first bore of a first chamber. The first piston member may have an outer perimeter that defines a first area. The valve assembly may also include a second piston member coupled to a valve closure element, and the second piston member may be displaceably disposed within a second bore of a second chamber. The second piston member may have an outer perimeter that defines a second area. So configured, a longitudinal displacement of the first piston member relative to the first chamber causes hydraulic fluid disposed within a sealed volume of the first chamber to act on the second piston member such that the second piston member longitudinally displaces and the valve closure element sealingly engages a valve seat to prevent flow from a valve inlet to a valve outlet. In addition, the second area is greater than the first area such that a downward force provided by the second piston member is greater than a downward force provided by the first piston member.

In addition, a method of actuating a control valve includes coupling a first piston member to a valve actuator and displaceably disposing the first piston member within a first bore of a first chamber. The method further includes coupling a second piston member to a valve closure element and displaceably disposing the second piston member within a second bore of a second chamber. A portion of the first bore of the first chamber is fluidically coupled to a portion of the second bore of the second chamber such that a displacement of the first piston member causes a fluid to act on the second piston member, thereby resulting in a corresponding displacement of the second piston member that causes the valve closure element to sealingly engage a valve seat to prevent flow from a valve inlet to a valve outlet. The method also includes sizing the first piston member and the second piston member such that a force acting on the second piston member is greater than a force acting on the first piston member.

DETAILED DESCRIPTION

Figure 1A:
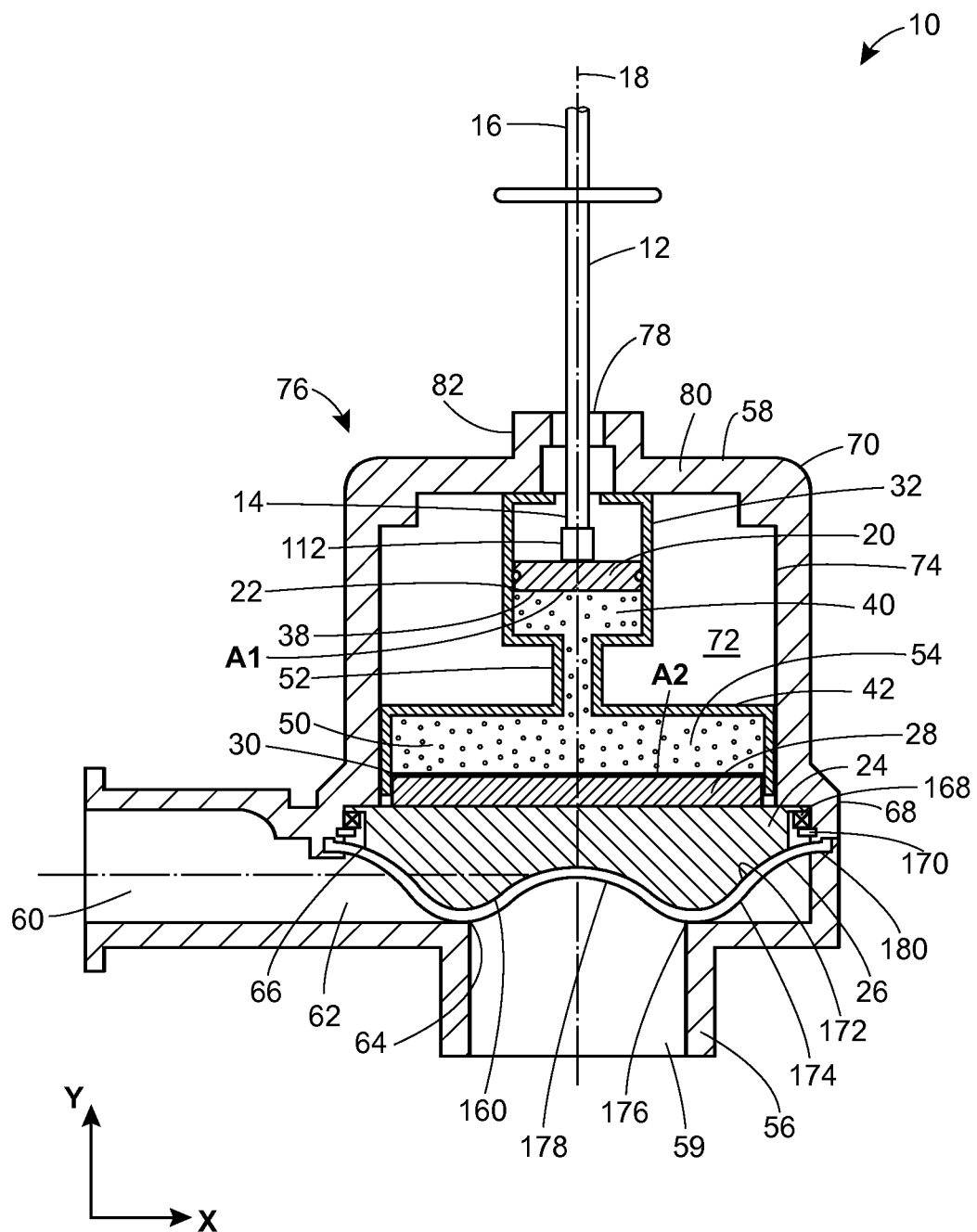
FIG. 1A is a sectional front view of an embodiment of a valve assembly showing the valve in a closed position, with the valve actuator omitted for clarity.
Figure 2A:
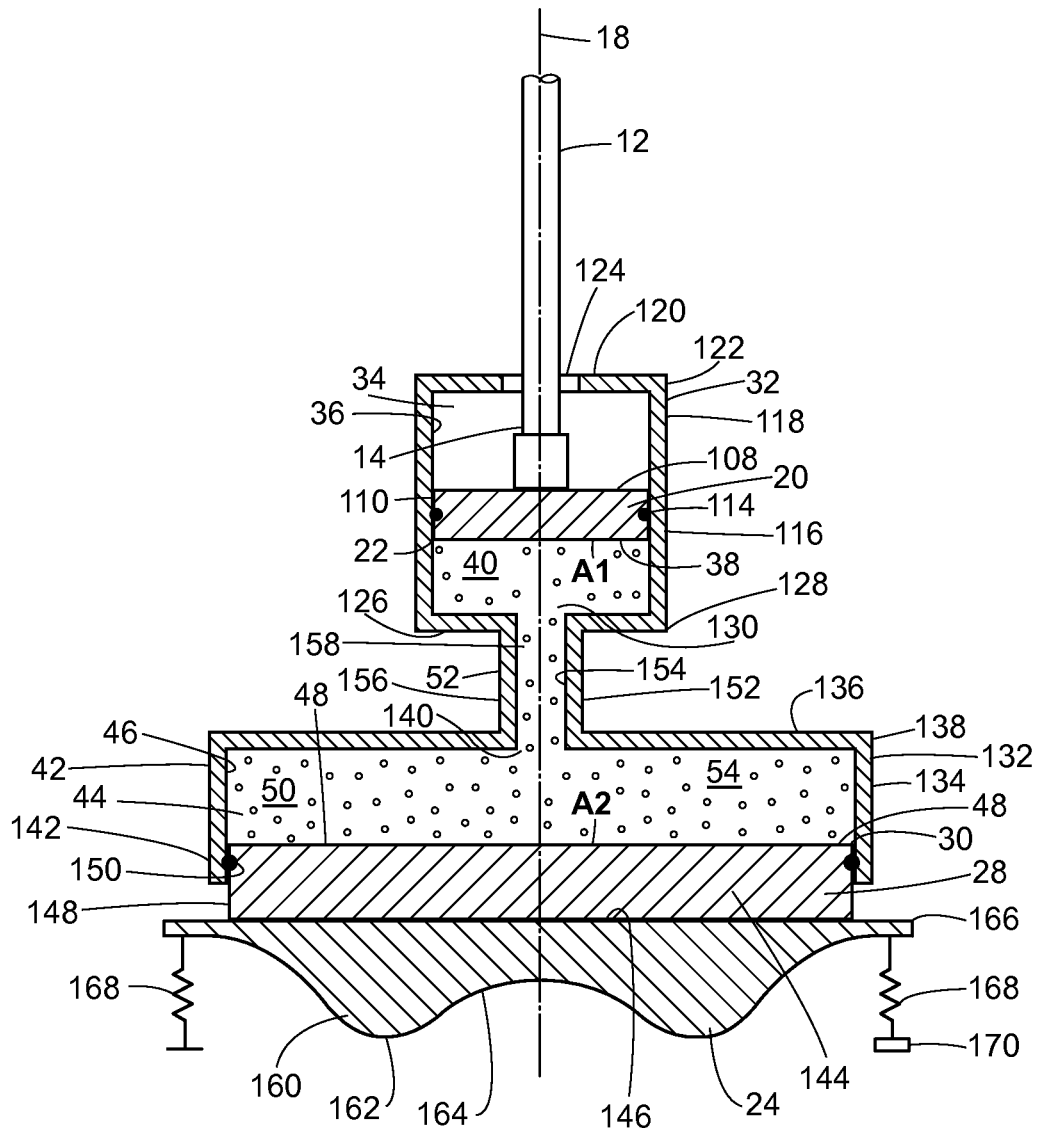
FIG. 2A is a partial sectional front view of the first chamber and second chamber of the valve assembly when then valve is in the closed position, with the diaphragm, the valve body, and the bonnet omitted for clarity.
Figure 2B:
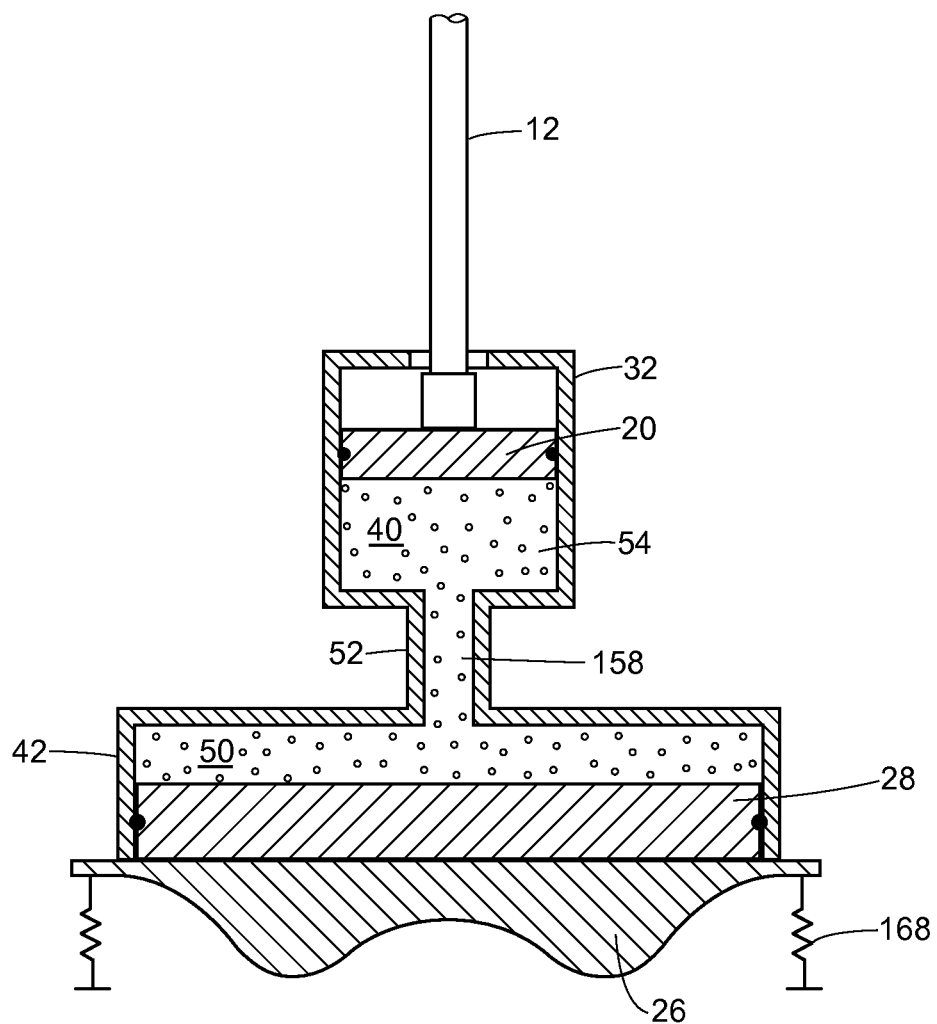
FIG. 2B is a partial sectional front view of the first chamber and second chamber of the valve assembly when then valve is in the open position, with the diaphragm, the valve body, and the bonnet omitted for clarity.

As illustrated in FIG. 1A, a valve assembly 10 includes a valve stem 12 having a first end 14 and a second end 16 and that extends along a longitudinal axis 18, the valve stem 12 adapted to displace along the longitudinal axis 18. The valve assembly 10 further includes a first piston member 20 coupled to the first end 14 of the valve stem 12, and the first piston member 20 has an outer perimeter 22 that defines a first area A1. The valve assembly 10 additionally includes a compression member 24 that is adapted to engage a diaphragm 26 and a second piston member 28 coupled to the compression member 24, the second piston member 28 having an outer perimeter 30 that defines a second area A2. Referring to FIGS. 2A and 2B, the valve assembly 10 additionally includes a first chamber 32 having a first bore 34 defined by one or more inner surfaces 36, the first bore 34 being adapted to receive the first piston member 20 such that the first piston member 20 is longitudinally displaceable within the first bore 34 relative to the first chamber 32, wherein the first piston member 20 sealingly engages the one or more inner surfaces 36 defining the first bore 34 such that a bottom portion 38 of the first piston member 20 and the one or more inner surfaces 36 defining the first bore 34 at least partially define a first interior volume 40.

Still referring to FIGS. 2A and 2B, the valve assembly 10 additionally includes a second chamber 42 having a second bore 44 defined by one or more inner surfaces 46, the second bore 44 being adapted to receive the second piston member 28 such that the second piston member 28 is longitudinally displaceable within the second bore 44 relative to the second chamber 42. The second piston member 28 sealingly engages the one or more inner surfaces 46 defining the second bore 44 such that a top portion 48 of the second piston member 28 and the one or more inner surfaces 46 defining the second bore 44 at least partially define a second interior volume 50. A conduit portion 52 extends from the first chamber 32 to the second chamber 42 such that the first interior volume 40 is in fluid communication with the second interior volume 50. A hydraulic fluid 54 is disposed in the first interior volume 40, the conduit portion 52, and the second interior volume 50 such that a downward displacement of the first piston member 20 relative to the first chamber 32 causes a portion of the hydraulic fluid 54 to provide pressure on the top portion 48 of the second piston member 28 and cause the second piston member 28 to downwardly displace. The hydraulic fluid 54 may be any suitable hydraulic liquid, such as food grade hydraulic oil.

So configured, the sanitary valve assembly 10 is packless and has fewer moving parts than conventional sanitary valves. In addition, because hydraulic fluid under pressure causes the second piston member 28 to displace the diaphragm 26 to close and open the valve assembly 10, debris or shavings within the interior of valve components will not affect valve performance. Accordingly, the disclosed valve assembly 10 has lower operational and maintenance costs than conventional valves while providing consistent and accurate closing forces and a longer operational life.

Turning to the valve assembly 10 in more detail, the valve assembly 10 includes a valve body 56 and a bonnet 58 coupled to a top portion of the valve body 56, as illustrated in FIG. 1A. The valve body 56 includes an inlet 59 and an outlet 60 and a passage 62 extending therebetween. The inlet 59 may be horizontally disposed and outlet 60 may be vertically disposed. The term "horizontal" as used herein refers to a direction parallel to or coaxial with the X axis in the reference coordinate system of FIG. 1A, and the term "vertical" refers to a direction parallel to or coaxial with the Y axis in the reference coordinate system of FIG. 1A. In alternative embodiments, the inlet 59 and outlet 60 may have any suitable orientation. For example, the inlet 59 and the outlet 60 may both be horizontally disposed. A perimeter edge of the outlet 60 formed where the outlet 60 intersects the inlet 59 may form a valve seat 64. A circular bonnet orifice 66 may be disposed opposite the valve seat 64 of the valve body 56, and the bonnet 58 may be secured to the valve body 56 to cover the bonnet orifice 66. The bonnet 58 may extend along the longitudinal axis 18 such that the bonnet 58 may have a first end 68 adjacent to the valve body 56 and a second end 70 opposite the first end 68. The bonnet 58 may have a hollow interior portion 72 that may be defined by one or more interior surfaces. For example, the bonnet 58 may be symmetrically or generally symmetrically formed about the longitudinal axis 18 such that the interior portion 72 is defined by a cylindrical inner wall 74. So configured, the bonnet 58 has the general shape of a cylinder with the first end 68 open to the hollow interior portion 72 that is partially defined by the cylindrical inner wall 74. The bonnet 58 may have a top portion 76 adjacent to the second end 70, and the top portion 76 may include a stem orifice 78 that is adapted to slidably receive the valve stem 12. Accordingly, the stem orifice 78 may have a shape that generally corresponds to the cross-sectional shape of the valve stem 12. For example, the stem orifice 78 may have a circular shape to receive a valve stem 12 having a circular cross-sectional shape. The stem orifice 78 may be formed in a top wall portion 80 or may be formed in a stem projection 82 that upwardly projects from the top wall portion 80, as illustrated in FIG. 1A. In addition, a seal (not shown), such as an o-ring, may be disposed at or adjacent to the stem orifice 78 to sealing engage the stem 12 to prevent debris from entering the interior portion 78 of the bonnet 58 through the stem orifice 78.

Figure 1B:
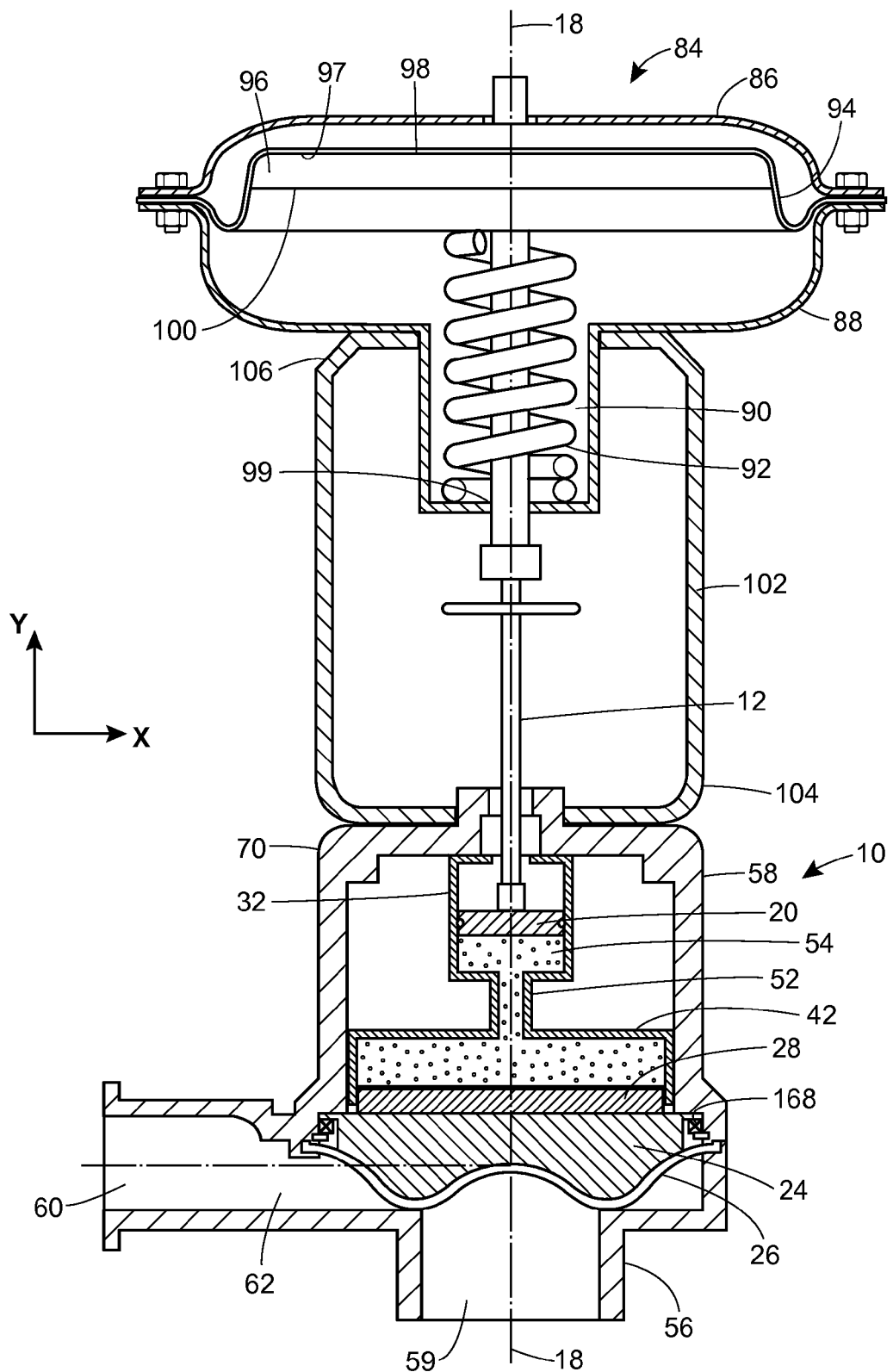
FIG. 1B is a sectional front view of the embodiment illustrated in FIG. 1A that includes the valve actuator.

Referring to FIG. 1B, the stem 12 of the valve assembly 10 may be coupled to a valve actuator assembly 84. The valve actuator assembly 84 may have an upper actuator casing 86 and a lower actuator casing 88 coupled to the upper actuator casing 86. The lower actuator casing 88 may include a spring recess 90 in which a coil spring 92 is at least partially disposed such that a lower portion of the coil spring 92 contacts a bottom portion of the spring recess 90. An actuator diaphragm 94 may be disposed between the upper actuator casing 86 and the lower actuator casing 88. The valve actuator assembly 84 also includes a diaphragm plate 96 disposed between the actuator diaphragm 94 and the lower actuator casing 88, and a lower surface 97 of the actuator diaphragm 94 engages a top surface 98 of the diaphragm plate 96. An actuator stem 99 may be coupled to the diaphragm plate 96 such that the actuator stem 99 downwardly extends (i.e., extends in a direction opposite to the Y-axis of the reference coordinate system of FIG. 1B) from a bottom surface 100 of the diaphragm plate 96. The coil spring 92 may be coaxially aligned with the actuator stem 99 such that the coil spring 92 surrounds a top portion of the actuator stem 99. So configured, a top portion of the coil spring 92 may engage the bottom surface 100 of the diaphragm plate 96 such that the coil spring 92 biases the diaphragm plate 96 in an upward direction (i.e., in the direction of the Y-axis of the reference coordinate system of FIG. 1B). A bottom portion of the actuator stem 99 may be coupled to the second end 16 of the valve stem 12 such that that a vertical displacement of the diaphragm plate 96 causes a corresponding vertical displacement of the valve stem 12.

Still referring to FIG. 1B, a yoke portion 102 may be disposed between the valve assembly 10 and the valve actuator assembly 84. More specifically, the yoke portion 102 may include a first end 104 and a second end 106 that is longitudinally opposite the first end 104. The first end 104 of the yoke portion 102 may be secured to top wall portion 80 of the bonnet 58, and the second end 106 of the yoke portion 102 may be secured to an exterior portion of the lower actuator casing 88.

Referring to FIGS. 1A and 1B, the valve stem 12 of the valve assembly 10 extends along the longitudinal axis 18 and includes the first end 14 and the second end 16 longitudinally opposite the first end 14. As described above, the second end 16 of the valve stem 12 may be coupled to the bottom portion of the actuator stem 99 such that a vertical displacement of the diaphragm plate 96 causes a corresponding displacement of the valve stem 12 along the longitudinal axis 18. As illustrated in FIG. 2A (in which, like FIG. 2B, the valve body 56, the diaphragm 26, and the bonnet 58 are omitted for clarity), the first piston member 20 may be coupled to the first end 14 of the valve stem 12, and the outer perimeter 22 of the first piston member 20 may define the first area A1. The outer perimeter 22 may be defined by an outer edge of the first piston member 20 when viewed along the longitudinal axis 18, and the outer perimeter 22 may have any suitable shape. In one embodiment, the first piston member 20 may have the shape of a disk (i.e., a cylindrical shape) having a top portion 108 disposed adjacent to the first end 14 of the valve stem 12 and with the bottom portion 38 disposed opposite the top portion 108. Each of the top portion 108 and the bottom portion 38 may comprise a planar surface. Alternatively, one or both of the top portion 108 and the bottom portion 38 may be contoured or partially contoured. A side portion 110 may extend between the top portion 108 and the bottom portion 38, and the side portion 110 may have a cylindrical or generally cylindrical shape. So configured, the circular edge formed by the intersection of the side portion 110 and the bottom portion 38 may form the outer perimeter 22 of the first piston member 20. In this example, the first area A1 defined by the outer perimeter 22 of the first piston member 20 may be $\pi(R1)^2$ where R1 is the radius of the circular outer perimeter 22. The radius R1 of the circular outer perimeter 22 may be slightly smaller than the radius of the cylindrical inner surface 36 of the first bore 34 of the first chamber 32.

The first piston member 20 may be coupled to the first end 14 of the valve stem 12 in any suitable manner. For example, the first end 14 of the valve stem 12 may be directly or indirectly mechanically fastened to the first piston member 20. More specifically, as illustrated in FIG. 2A, the first end 14 of the valve stem 12 may be threaded, and the threaded first end 14 may threadedly engage a corresponding threaded bore disposed in a projection 112 that upwardly extends from the top portion 108 of the first piston member 20. Alternatively, a separate fastening member may secure the first end 14 of the valve stem 12 to the first piston member 20, or the first end 14 of the valve stem 12 may be directly or indirectly welded to the first piston member 20. In addition, a seal 114 may be circumferentially secured to the first piston member 20 to prevent fluid from flowing between the side portion 110 of the first piston member 20 and the inner surface 36 of the first chamber 32 when the first piston member 20 is disposed within the first bore 34, as illustrated in FIG. 2A. For example, the seal 114 may be an O-ring, and the O-ring may be at least partially disposed in a circumferential groove (not shown) formed in the side portion 110 of the first piston member 20. Instead of a single seal 114, more than one seal 114 may be used.

Referring to FIG. 2A, the valve assembly 10 also includes the first chamber 32, and the first chamber 32 includes the first bore 34 extending along the longitudinal axis 18. The first chamber 32 may have any suitable shape such that one or more inner surfaces defines the first bore 34. For example, the first chamber 32 may have an overall cylindrical shape, and the first chamber 32 may include a side wall 116 that includes a cylindrical outer surface 118 and the cylindrical inner surface 36, and the inner surface 36 may define the first bore 34. The side wall 116 may have any suitable thickness to remain rigid and substantially undeformed when the first piston member 20 and the second piston member 28 exert pressure on the hydraulic fluid 54 in the manner that will be described in more detail below. A longitudinal axis of the cylindrical inner surface 36 may extend along the longitudinal axis 18, and the longitudinal axis of the cylindrical inner surface 36 may be coaxially aligned with the longitudinal axis 18. A top wall 120 may be disposed at or adjacent to a first end 122 of the first chamber 32, and the top wall 120 may be planar or substantially planar. A stem aperture 124 may extend through the top wall 120, and the stem aperture 124 may be dimensioned to be slightly larger than the stem 12, and the stem aperture 124 may generally correspond in shape to the stem 12. For example, if the stem 12 has a circular cross-section, the stem aperture 124 may also have a circular shape. A longitudinal axis of the stem aperture 124 may be coaxially aligned with the longitudinal axis 18. When the first piston member 20 is disposed within the first bore 34, the stem 12 may extend through the stem aperture 124 such that the second end 16 of the stem 12 is disposed external to the first bore 34 (and to the first chamber 32).

Still referring to FIG. 2A, a bottom wall 126 may be disposed at or adjacent to a second end 128 of the first chamber 32, and the bottom wall 126 may be planar or substantially planar. A first conduit aperture 130 may extend through the top wall 120, and the first conduit aperture 130 may have any suitable shape. For example, the first conduit aperture 130 have be circular in shape, and the diameter of the first conduit aperture 130 may be smaller than the diameter of the outer perimeter 22 of the first piston member 20. The thickness of the bottom wall may correspond or generally correspond to the thickness of the side wall 116.

The first chamber 32 may be secured to the bonnet 58, and the first chamber 32 may be coupled to the bonnet 58 in any suitable manner or in any suitable orientation. For example, the first chamber 32 may be secured to the bonnet 58 such that an outer surface of the top wall 120 of the first chamber 32 may be adjacent to or in contact with the inner surface of the top wall portion 80 of the bonnet 58. The first chamber 32 may be secured to the bonnet 58 by mechanical fastening, welding, or adhesives, for example. The first chamber 32 may be fabricated from any suitable material, such as stainless steel.

So configured, the first piston member 20 may be longitudinally displaceable (i.e., displaceable along the longitudinal axis 18) within the first bore 34 relative to the first chamber 32. As explained above, the seal (or seals) 114 sealingly engages the inner surface 36 of the side wall 116, and the sealing engagement is maintained when the first piston member 20 is longitudinally displaced within the first bore 34. Accordingly, the first piston member 20 sealingly engages the one or more inner surfaces defining the first bore 34 such that the bottom portion 38 of the first piston member 20 and the one or more inner surfaces defining the first bore 34 at least partially define the first interior volume 40. For example, the bottom portion 38 of the first piston member 20, the inner surface 36 of the side wall 116, and an upper surface of the bottom wall 126 may cooperate to partially define the first interior volume 40. The first piston member 20 may be fabricated from any suitable material, such as stainless steel.

Referring to FIG. 2A, the valve assembly 10 also includes the second chamber 42, and the second chamber 42 includes the second bore 44 extending along the longitudinal axis 18. The second chamber 42 may have any suitable shape such that one or more inner surfaces defines the second bore 44. For example, the second chamber 42 may have an overall cylindrical shape, and the second chamber 42 may include a side wall 132 that includes a cylindrical outer surface 134 and the cylindrical inner surface 46, and the inner surface 46 may define the second bore 44. The diameter of the cylindrical inner surface 46 may be substantially larger than the diameter of the cylindrical inner surface 36 of the first chamber 32. The side wall 132 may have any suitable thickness to remain rigid and substantially undeformed when the second piston member 20 and the second piston member 28 exert pressure on the hydraulic fluid 54 in the manner that will be described in more detail below. A longitudinal axis of the cylindrical inner surface 46 may extend along the longitudinal axis 18, and the longitudinal axis of the cylindrical inner surface 46 may be coaxially aligned with the longitudinal axis 18. A top wall 136 may be disposed at or adjacent to a first end 138 of the second chamber 42, and the top wall 136 may be planar or substantially planar. A second conduit aperture 140 may extend through the top wall 136, and the second conduit aperture 140 may have the same shape and size as the first conduit aperture 130. For example, if the first conduit aperture 130 is circular in shape, the diameter of the second conduit aperture 140 may be the same as that of the first conduit aperture 130. A longitudinal axis of the second conduit aperture 140 may be coaxially aligned with the longitudinal axis 18. A second end 142 of the second chamber 42 may be open such that all or a portion of the second piston member 28 may be inserted through the open second end 142 to be received into the second bore 44. So configured, the second piston member 28 may be longitudinally displaceable (i.e., displaceable along the longitudinal axis 18) within the second bore 36 relative to the second chamber 42. The second chamber 42 may be secured to the bonnet 58 in any suitable manner or in any suitable orientation. For example, the second chamber 42 may be secured to the bonnet 58 such that an outer surface 134 of the side wall 132 of the second chamber 42 may be adjacent to or in contact with the inner wall 74 of the bonnet 58. The second chamber 42 may be secured to the bonnet 58 by mechanical fastening, welding, or adhesives, for example. The second chamber 42 may be fabricated from the same material or materials as the first chamber 32.

Referring to FIG. 2A, the valve assembly 10 also includes the second piston member 28 coupled to the compression member 24. More specifically, a bottom portion 144 of the second piston member 28 may be coupled or otherwise fixedly secured to a top portion 146 of the compression member 24 in any suitable manner. For example, the bottom portion 144 of the second piston member 28 may be mechanically coupled to the top portion 146 of the compression member 24. Alternatively, the second piston member 28 may be coupled to the compression member 24 using an adhesive or by welding, for example. In addition, the second piston member 28 may be indirectly coupled to the compression member 24, and one or more an intermediate members or portions (e.g., a longitudinally-disposed stem) may be disposed between the bottom portion 144 of the second piston member 28 and the top portion 146 of the compression member 24.

The outer perimeter 30 of the second piston member 28 may be defined by an outer edge of the top portion 48 of the second piston member 28 when viewed along the longitudinal axis 18, and the outer perimeter 30 may have any suitable shape. In one embodiment, the second piston member 28 may have the shape of a disk (i.e., a cylindrical shape), and the top portion 48 may include a planar surface. Alternatively, the top portion 108 may be contoured or partially contoured. A side portion 148 may extend between the top portion 48 and the bottom portion 144, and the side portion 148 may have a cylindrical or generally cylindrical shape. So configured, the circular edge formed by the intersection of the side portion 148 and the top portion 48 may form the outer perimeter 30 of the second piston member 28. In this example, the second area A2 defined by the outer perimeter 30 of the second piston member 28 may be $\pi(R2)^2$ where R2 is the radius of the circular outer perimeter 30. The radius R2 of the circular outer perimeter 30 may be slightly smaller than the radius of the cylindrical inner surface 46 of the second bore 44 of the second chamber 42. The second area A2 of the second piston member 28 is preferably greater than the first area A1 of the first piston member 20. The second piston member 28 may be fabricated from the same material or materials as the first piston member 20.

In addition, a seal 150 may be circumferentially secured to the second piston member 28 to prevent fluid from flowing between the side portion 148 of the second piston member 28 and the inner surface 46 of the second chamber 42 when the second piston member 28 is disposed within the second bore 44. For example, the seal 150 may be an O-ring, and the O-ring may be at least partially disposed in a circumferential groove (not shown) formed in the side portion 148 of the second piston member 28. Instead of a single seal 150, more than one seal 150 may be used.

As the second piston member 28 is longitudinally displaced (i.e., displaced along the longitudinal axis 18) within the second bore 34 relative to the second chamber 42, the seal (or seals) 150 sealingly engages the inner surface 46 of the side wall 132. Accordingly, the second piston member 28 sealingly engages the one or more inner surfaces defining the second bore 44 such that the top portion 48 of the second piston member 28 and the one or more inner surfaces defining the second bore 44 at least partially define the second interior volume 50. For example, the top portion 48 of the second piston member 28, the inner surface 46 of the side wall 132, and a lower surface of the top wall 136 may cooperate to partially define the second interior volume 50.

Referring to FIG. 2A, the valve assembly 10 also includes the conduit portion 52. The conduit portion 52 may include a side wall 152 having an inner surface 154 and an outer surface 156, and the side wall 152 may be rigid. The conduit portion 52 may have any suitable cross-sectional shape. For example, the conduit portion 52 may have a circular cross-sectional shape such that the side wall 152 is a hollow cylinder. A longitudinal axis of conduit portion 52 may extend along the longitudinal axis 18, and the longitudinal axis of the cylindrical conduit portion 52 may be coaxially aligned with the longitudinal axis 18. The first conduit aperture 130 of the first chamber 32 and the second conduit aperture 140 of the second chamber 42 may partially define the inner surface 154 of the side wall 152. So configured, an interior volume 158 of the conduit portion 52 may be in fluid communication with each of the first interior volume 40 and the second interior volume 50. Accordingly, the hydraulic fluid 54 disposed within the first interior volume 40 and the second interior volume 50 may move between the first interior volume 40 and the second interior volume 50 via the interior volume 158 of the conduit portion 52.

The conduit portion 52 may be made of the same material as the first and second chambers 32, 42, and may be secured to the first and second chambers 32, 42 in any suitable manner (e.g., mechanical fastening, welding, adhesives, etc.). Instead of having a rigid sidewall 152, the sidewall 152 may be flexible. For example, the conduit portion 52 may be a flexible tube extending between the first conduit aperture 130 of the first chamber 32 and the second conduit aperture 140 of the second chamber 42.

As illustrated in FIGS. 1A, 2A and 2B, the valve assembly 10 also includes the compression member 24. As previously explained, the bottom portion 144 of the second piston member 28 may be coupled or otherwise fixedly secured to the top portion 146 of the compression member 24 such that the a longitudinal displacement of the second piston member 28 results in a corresponding longitudinal displacement of the compression member 24. The compression member 24 may have a contoured lower portion 160, and the lower portion 160 may include a rounded peak 162 that is symmetrical about an axis that may be coaxially aligned with the longitudinal axis 18. An inner portion of the peak 162 may define a central depression 164 that is symmetrical about an axis that may be coaxially aligned with the longitudinal axis 18. An outer peripheral portion of the compression member 24 may form a flange 166, and the flange 166 may have a circular outer edge that has a diameter greater than the diameter of the outer surface 134 of the second chamber 42.

With the second piston member 28 disposed within the second bore 44, a biasing member 168, such as a wave spring, may act on the bottom portion 160 of the compression member 24 adjacent to the flange 166 to bias the compression member 24 towards the top wall 136 of the second chamber 42, as illustrated in FIGS. 1A and 2A. The biasing member 168 may be secured in a fixed position relative to the biasing member 168 in any suitable manner. For example, the biasing member 168 may be held in place by a stationary snap ring 170 that is secured within a groove formed on an interior surface of the bonnet 58 adjacent to the first end 68 of the bonnet 58. As illustrated in FIG. 1A, the compression member 24 may be adapted to engage the diaphragm 26 that is disposed between the compression member 24 and the valve seat 64. Specifically, the diaphragm 26 includes a top portion 172 and a bottom portion 174. The top portion 172 is adapted to conform in shape to the bottom portion 160 of the compression member 24 such that the contours of the bottom portion 160 of the compression member 24 engage and are received into corresponding contours of the top portion 172 of the diaphragm 26. The top portion 172 of the diaphragm 26 is generally uniformly offset from the bottom portion 174 of the diaphragm 26 such the general shape of the bottom portion 174 corresponds to the general shape of the bottom portion 160 of the compression member 24. That is, the bottom portion 174 of the diaphragm 26 may include a rounded peak 176 that is symmetrical about an axis that may be coaxially aligned with the longitudinal axis 18. An inner portion of the peak 176 may define a central depression 178 that is symmetrical about an axis that may be coaxially aligned with the longitudinal axis 18. An outer peripheral portion of the diaphragm 26 may form a flange portion 180, and the flange portion 180 may have a diameter greater than the diameter of the circular outer edge of the compression member 24.

Figure 1C:
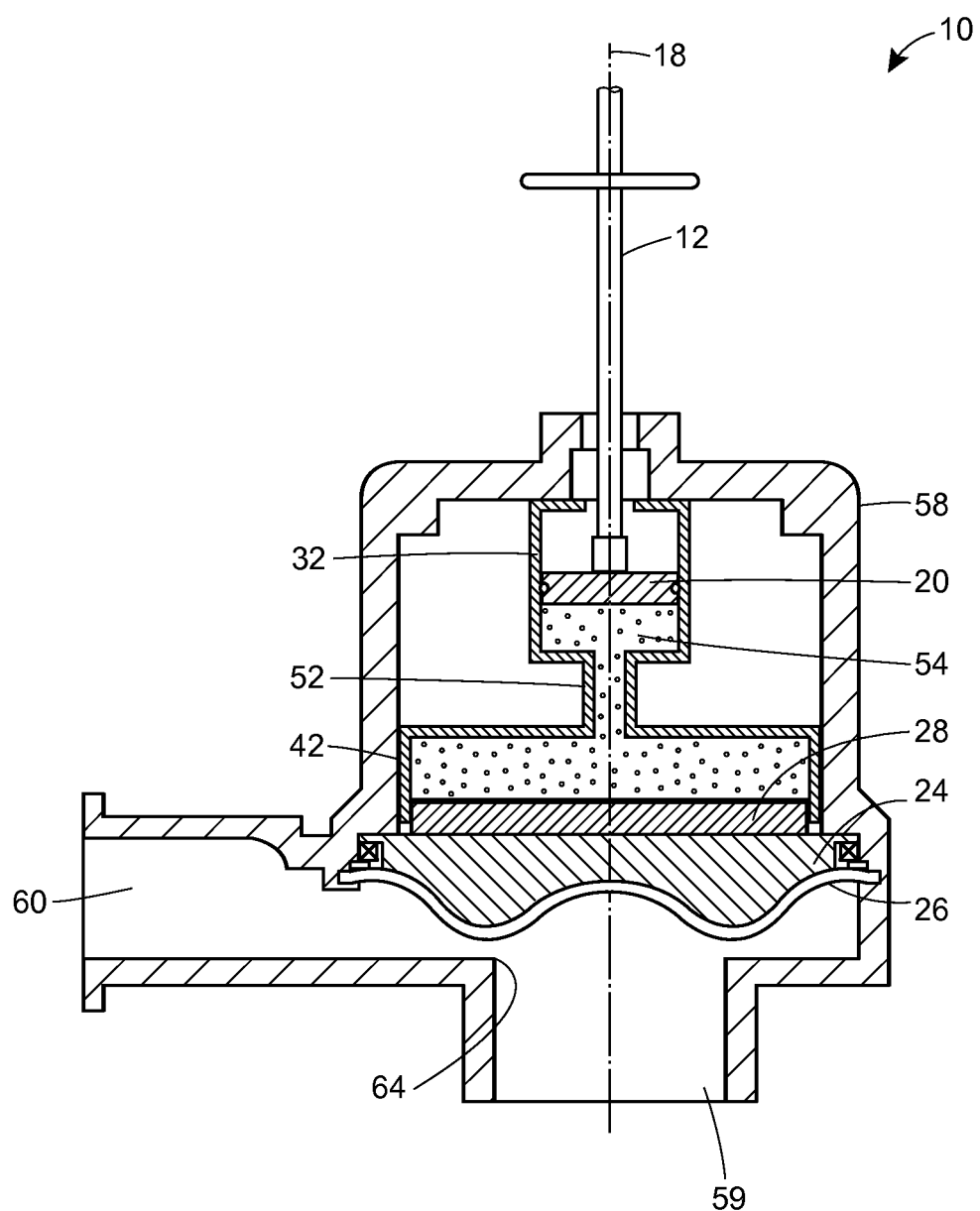
FIG. 1C is a partial sectional front view of the embodiment illustrated in FIG. 1A with the valve in an open position.

Still referring to FIG. 1A, the flange portion 180 may be captured between the first end 68 of the bonnet 58 and the valve body 56 adjacent to the bonnet orifice 66 when the bonnet 58 is secured to the valve body 56. So secured, the diaphragm 26 acts as a seal that prevents fluids flowing through the passage 62 of the valve body 56 from flowing or otherwise entering the bonnet orifice 66. When the second piston member 28 is in a first position (i.e., a valve closed position) illustrated in FIGS. 1A, 1B, and 2A, the apex of the peak 176 of the diaphragm 26 sealingly engages a surface of the valve body 56 defining the valve seat 64 such that fluid entering the inlet 68 is prevented by the diaphragm 26 from entering the passage 62 to ultimately flow to the outlet 60. However, when the second piston member 28 is in a second position (i.e., a valve open position) illustrated in FIGS. 1C and 2B, the apex of the peak 176 of the diaphragm 26 is longitudinally offset from the surface of the valve body 56 defining the valve seat 64, and therefore fluid entering the inlet 68 continues to flow into the passage 62 and to the outlet 60.

In operation, when the valve assembly 10 is to move from a valve open position to a valve closed position, pressurized fluid may be provided in the interior cavity of the upper actuator casing 86 of the valve actuator 84 in a known manner, and this pressure acts of the actuator diaphragm 94 such that the diaphragm plate 96 is downwardly displaced, as illustrated in FIG. 1B. As the actuator diaphragm 94 downwardly displaces, the actuator stem 99 and the valve stem 12 also downwardly displace, resulting in a downward displacement of the first piston member 20 within the first chamber 32. This downward displacement of the first piston member 20 within the first chamber 32 causes the hydraulic fluid 54 within the first interior volume 40 to enter the interior volume of the 158 of the conduit portion 52 and into the second interior volume 50. Because the hydraulic fluid 54 is incompressible or substantially incompressible, hydraulic fluid 54 that enters the second interior volume 50 due to the displacement of the first piston member 20 applies a pressure on the top portion 48 of the second piston member 28, and the resulting downward force causes the second piston member 28 to downwardly displace against the upward biasing force provided on the compression member 24 by the biasing member 168. As the second piston member 28 downwardly displaces, the second piston member 28 moves from the second position (the valve open position) to the first position (the valve closed position). In the first position, the apex of the peak 176 of the diaphragm 26 sealingly engages the surface of the valve body 56 defining the valve seat 64 such that fluid entering the inlet 68 is prevented by the diaphragm 26 from entering the passage 62 to ultimately flow to the outlet 60.

To open the valve assembly 10 (i.e., to move the second piston member 28 from the first position to the second position), pressurized fluid in the interior cavity of the upper actuator casing 86 of the valve actuator 84 is vented to the atmosphere, and the spring 92 forces the diaphragm plate 96 to upwardly displace, and this upward displacement causes the first piston member 20 to upwardly displace within the stationary first chamber 32. Because the biasing member 168 provides an upward force on the compression member 24 and the second piston member 28 secured thereto, and because the pressure provided by the hydraulic fluid 54 on the second piston member 28 is reduced as the first piston member 20 upwardly displaces, the second piston member 28 is upwardly displaced. This upward displacement of the second piston member 28 forces hydraulic fluid 54 out of the second interior volume 50, through the interior volume of the 158 of the conduit portion 52, and into the first interior volume 40. The force and longitudinal travel of the biasing member 168 are selected to ensure that the bottom portion 38 of the first piston member 20 is in contact with the hydraulic fluid 54 when the valve assembly 10 is in the second position. One having ordinary skill in the art would recognize that an intermediate position between the first position and the second position may be maintained by providing a desired pressure in the interior cavity of the upper actuator casing 86 of the valve actuator 84 that results in an desired downward displacement of the diaphragm plate 96 that is less than the downward displacement of the diaphragm plate 96 that corresponds to the first position and that is greater than the downward displacement of the diaphragm plate 96 (if any) that corresponds to the second position.

As previously explained, the first piston member 20 has an outer perimeter 22 that defines a first area A1 and the second piston member 28 has an outer perimeter 30 that defines a second area A2, and the second area A2 of the second piston member 28 is preferably greater than the first area A1 of the first piston member 20. So configured, the valve actuator 84 provides a downward force on the first piston member 20 as the valve actuator 84 downwardly displaces the first piston member 20. This downward force results in a first pressure on the hydraulic fluid 54 in the first interior volume 40, and this pressure is approximately equal to the downward force of the actuator divided by the first area A1. One having ordinary skill in the art would recognize the pressure resulting from the downward displacement of the first piston member 20 also acts on the second piston member 28, and therefore the downward force acting on the second piston member 28 is proportional to the ratio of the second area A2 and the first area A1. That is, if the second area A2 is double the first area A1, the force acting on the second piston member 28 is twice the force provided by the first piston member 20 (which is, in turn, the force provided by the downward force of the valve actuator 84). The ratio of the second area A2 and the first area A1 may have any suitable value. For example, the ratio of the second area A2 and the first area A1 may be between 1.5 and 10 (i.e., the second area A2 may be between 1.5 and 10 times greater than the first area A1). Accordingly, such a hydraulic system acts as a force multiplier increasing the mating force between the diaphragm 26 and the valve seat 64.

Configured as described, the sanitary valve assembly 10 has few moving parts, resulting in less worn or damaged parts, less maintenance costs, less valve downtime, and a longer operational life than conventional sanitary valves. Moreover, the disclosed hydraulic system provides accurate closing forces on the compression member 26 resulting in consistent sealing performance between the diaphragm 26 and the valve seat 64 regardless of the presence of debris on the interior portion 72 of the bonnet 58. In addition, the sanitary valve assembly 10 is packless because the diaphragm 26 operates to isolate the interior portion 72 of the bonnet 58 from the process fluid flowing through the passage 62. One having ordinary skill in the art would recognize that such a packless sanitary valve assembly 10 reduces maintenance costs and minimizes valve downtime.

While various embodiments have been described above, this disclosure is not intended to be limited thereto. Variations can be made to the disclosed embodiments that are still within the scope of the appended claims. For example, the valve actuator assembly 10 of the present disclosure may be used with any suitable control valve.

What is claimed is:

1. A valve assembly comprising:
   a valve stem having a first end and a second end that extends along a longitudinal axis, the valve stem adapted to displace along the longitudinal axis;
   a first piston member coupled to the first end of the valve stem, the first piston member having an outer perimeter that defines a first area;
   a compression member that is adapted to engage a diaphragm;
   a second piston member coupled to the compression member, the second piston member having an outer perimeter that defines a second area;
   a first chamber having a first bore defined by one or more inner surfaces, the first bore being adapted to receive the first piston member such that the first piston member is longitudinally displaceable within the first bore relative to the first chamber, wherein the first piston member sealingly engages the one or more inner surfaces defining the first bore such that a bottom portion of the first piston member and the one or more inner surfaces defining the first bore at least partially define a first interior volume, wherein the first chamber is not deformable along the longitudinal axis, and wherein the first piston is disposed entirely within the first bore of the first chamber;
   a second chamber having a second bore defined by one or more inner surfaces, the second bore being adapted to receive the second piston member such that the second piston member is longitudinally displaceable within the second bore relative to the second chamber, wherein the second piston member sealingly engages the one or more inner surfaces defining the second bore such that a top portion of the second piston member and the one or more inner surfaces defining the second bore at least partially define a second interior volume, wherein the second chamber is not deformable along the longitudinal axis; and
   a conduit portion extending from the first chamber and the second chamber such that the first interior volume is in fluid communication with the second interior volume; and
   a hydraulic fluid disposed in the first interior volume, the conduit portion, and the second interior volume such that a downward displacement of the first piston member relative to the first chamber causes a portion of the hydraulic fluid to provide pressure on the top portion of the second piston member and cause the second piston member to downwardly displace.

2. The valve assembly of claim 1, wherein the second area of the second piston member is greater than the first area of the first piston member.

3. The valve assembly of claim 2, wherein the second area is between 1.5 and 10 times greater than the first area.

4. The valve assembly of claim 1, wherein a resilient member biases the compression member towards the first piston member such that when the first piston member is upwardly displaced relative to the first chamber, the second piston member is displaced towards the first piston member to maintain the bottom portion of the first piston member in contact with the hydraulic fluid.

5. The valve assembly of claim 1, wherein the second piston member is coupled to a top portion of the compression member, and a bottom portion of the compression member is adapted to engage the diaphragm.

6. The valve assembly of claim 1, wherein each of the first chamber, the second chamber, the first piston member, and the second piston member has a circular cross-sectional shape.

7. The valve assembly of claim 6, wherein each of the first chamber, the second chamber, the first piston member, the second piston member, and the valve stem is coaxially-aligned with the longitudinal axis.

8. The valve assembly of claim 1, wherein the conduit portion is disposed between a bottom portion of the first chamber and a top portion of the second chamber.

9. The valve assembly of claim 1, wherein a first O-ring is circumferentially disposed on the first piston member to sealingly engage the one or more inner surfaces defining the bore of the first chamber, and wherein a second O-ring is circumferentially disposed on the second piston member to sealingly engage the one or more inner surfaces defining the bore of the second chamber.

10. The valve assembly of claim 1, wherein the first bore extends along the longitudinal axis and the second bore extends along the longitudinal axis.

11. A valve assembly comprising:
a first piston member coupled to a first end of a valve stem, the first piston member being displaceably disposed within a first bore of a first chamber, the first piston member having an outer perimeter that defines a first area;
a second piston member coupled to a valve closure element, the second piston member being displaceably disposed within a second bore of a second chamber, the second piston member having an outer perimeter that defines a second area;
wherein a longitudinal displacement of the first piston member relative to the first chamber causes hydraulic fluid disposed within a sealed volume of the first chamber to act on the second piston member such that the second piston member longitudinally displaces and the valve closure element sealingly engages a valve seat to prevent flow from a valve inlet to a valve outlet, and
wherein the second area is greater than the first area such that a downward force provided by the second piston member is greater than a downward force provided by the first piston member, wherein the first chamber and the second chamber are each not longitudinally deformable, and wherein the first piston is disposed entirely within the first bore of the first chamber.

12. The valve assembly of claim 11, wherein the first piston member sealingly engages an inner surface of the first chamber that defines the first bore and wherein the second piston member sealingly engages an inner surface of the second chamber that defines the second bore.

13. The valve assembly of claim 11, wherein a second end of the valve stem is coupled to a valve actuator.

14. The valve assembly of claim 11, wherein each of the first chamber, the second chamber, the first piston member, and the second piston member has a circular cross-sectional shape.

15. The valve assembly of claim 14, wherein each of the first chamber, the second chamber, the first piston member, and the second piston member is coaxially-aligned with a longitudinal axis.

16. The valve assembly of claim 11, wherein a conduit portion couples the first chamber and the second chamber such that the sealed volume of the first chamber is in fluid communication with a sealed volume of the second chamber, and wherein the hydraulic fluid in the sealed volume of the second chamber acts on the second piston member to longitudinally displace the second piston member.

17. The valve assembly of claim 11, wherein the second piston member is coupled to a diaphragm that acts as the valve closure member.

18. The valve assembly of claim 17, wherein the second piston member is coupled to a top portion of a compression member, and a bottom portion of the compression member engages the diaphragm.

19. A method of closing a control valve comprising:
downwardly displacing a valve stem;
downwardly displacing a first piston member coupled to the valve stem by the downward displacement of the valve stem;
applying a pressure on hydraulic fluid by the downward displacement of the first piston member, wherein the hydraulic fluid transfers the pressure to a second piston member to downwardly displace the second piston member, and wherein the second piston member has a greater area than the first piston member such that a downward force on the second piston member is greater than a downward force acting on the first piston member;
downwardly displacing a valve closure member coupled to the second piston member such that the valve closure member sealingly engages a valve seat; and
applying a force to a diaphragm with a fluid to downwardly displace the valve stem, the diaphragm being coupled to the valve stem.

20. A valve assembly comprising:
a valve stem having a first end and a second end that extends along a longitudinal axis, the valve stem adapted to displace along the longitudinal axis;
a first piston member coupled to the first end of the valve stem, the first piston member having an outer perimeter that defines a first area;
a compression member that is adapted to engage a diaphragm;
a second piston member coupled to the compression member, the second piston member having an outer perimeter that defines a second area;
a first chamber having a first bore defined by one or more inner surfaces, the first bore being adapted to receive the first piston member such that the first piston member is longitudinally displaceable within the first bore relative to the first chamber, wherein the first piston member sealingly engages the one or more inner surfaces defining the first bore such that a bottom portion of the first piston member and the one or more inner surfaces defining the first bore at least partially define a first interior volume;
a second chamber having a second bore defined by one or more inner surfaces, the second bore being adapted to receive the second piston member such that the second piston member is longitudinally displaceable within the second bore relative to the second chamber, wherein the second piston member sealingly engages the one or more inner surfaces defining the second bore such that a top portion of the second piston member and the one or more inner surfaces defining the second bore at least partially define a second interior volume;
a conduit portion extending from the first chamber and the second chamber such that the first interior volume is in fluid communication with the second interior volume;
a hydraulic fluid disposed in the first interior volume, the conduit portion, and the second interior volume such that a downward displacement of the first piston member relative to the first chamber causes a portion of the hydraulic fluid to provide pressure on the top portion of the second piston member and cause the second piston member to downwardly displace; and a resilient member adapted to bias the compression member towards the first piston member such that when the first piston member is upwardly displaced relative to the first chamber, the second piston member is displaced towards the first piston member to maintain the bottom portion of the first piston member in contact with the hydraulic fluid.

* * * * *